(12) United States Patent
Perni et al.

(10) Patent No.: US 7,121,379 B2
(45) Date of Patent: Oct. 17, 2006

(54) STEERING UNIT FOR AN ELECTRIC VEHICLE

(75) Inventors: Federico Perni, Trevi (IT); Luciano Pizzoni, Foligno (IT); Lucio Lopparelli, Foligno (IT)

(73) Assignee: Umbra Cuscinetti S.p.A., Foligno (IT)

( * ) Notice: Subject to any disclaimer, the term of this patent is extended or adjusted under 35 U.S.C. 154(b) by 0 days.

(21) Appl. No.: 11/076,573

(22) Filed: Mar. 9, 2005

(65) Prior Publication Data

US 2005/0199435 A1    Sep. 15, 2005

(30) Foreign Application Priority Data

Mar. 10, 2004    (EP)    ................................. 04425160

(51) Int. Cl.
*B62D 5/04* (2006.01)
(52) U.S. Cl. ..................................... 180/444; 74/424.85
(58) Field of Classification Search ................ 180/443, 180/444; 74/424.82, 424.85
See application file for complete search history.

(56) References Cited

U.S. PATENT DOCUMENTS

| | | |
|---|---|---|
| 4,258,584 A | 3/1981 | Haegele et al. |
| 4,366,723 A * | 1/1983 | Wilke et al. ............... 74/89.24 |
| 5,505,547 A | 4/1996 | Kodaira |
| 5,899,114 A | 5/1999 | Dolata et al. |

FOREIGN PATENT DOCUMENTS

| | | |
|---|---|---|
| EP | 0 930 214 | 7/1999 |
| GB | 815 730 | 7/1959 |
| GB | 1 049 179 | 11/1966 |
| GB | 2 388 352 | 11/2003 |

* cited by examiner

*Primary Examiner*—Kevin Hurley
(74) *Attorney, Agent, or Firm*—Ladas and Parry LLP

(57) ABSTRACT

A steering unit of an electric vehicle is equipped with an electric motor having a tubular output shaft, through which a steering rod is assembled connected to the same output shaft by means of a recirculating ball screw-nut screw coupling so as to control the steering of a pair of wheels of the vehicle; the screw-nut screw coupling being defined by a train of balls engaged in a recirculating track made up of a first section made between the output shaft and the steering rod, of a second section made through the steering rod, and of two third sections connecting the first and the second section with one another.

7 Claims, 3 Drawing Sheets

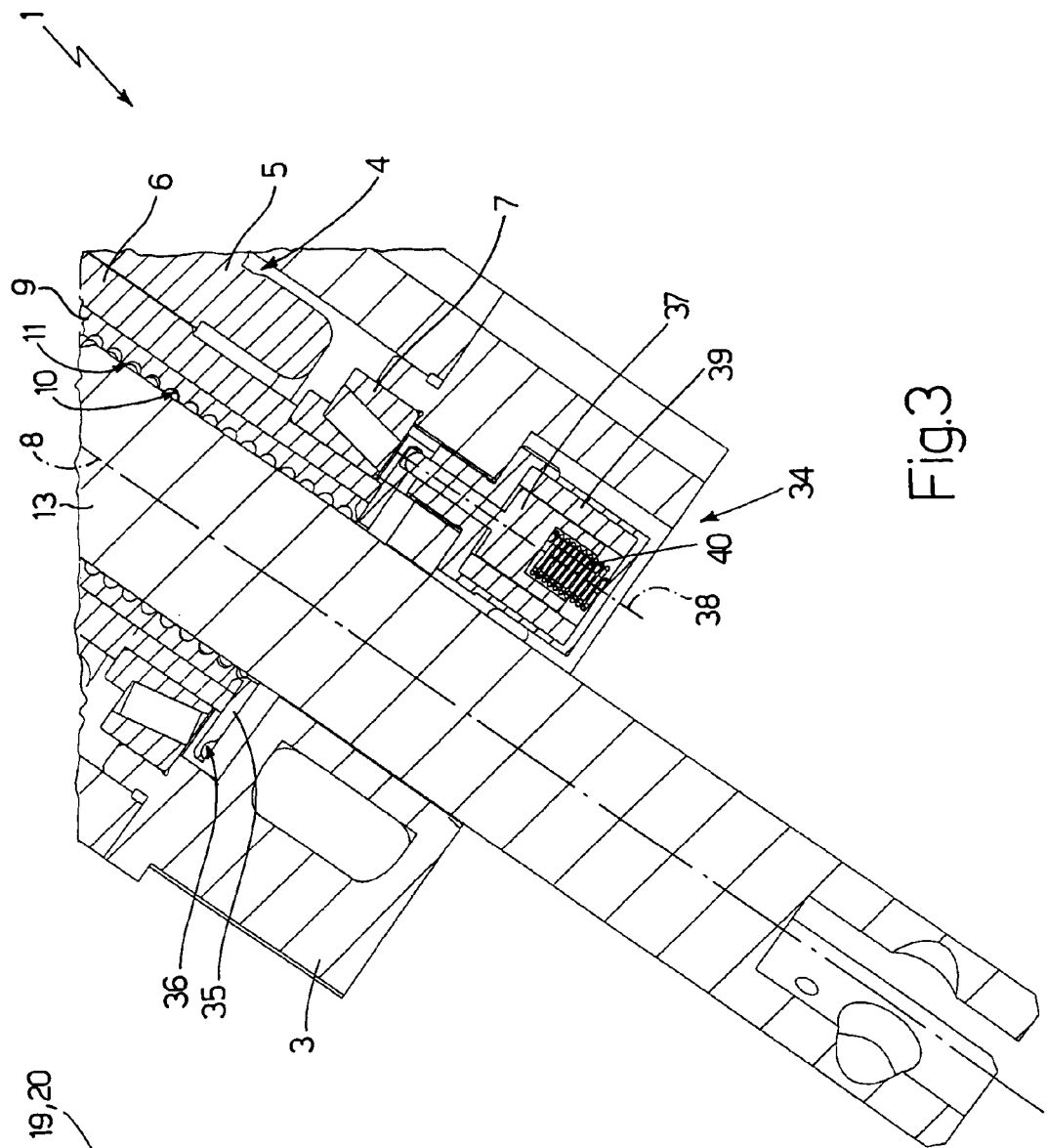
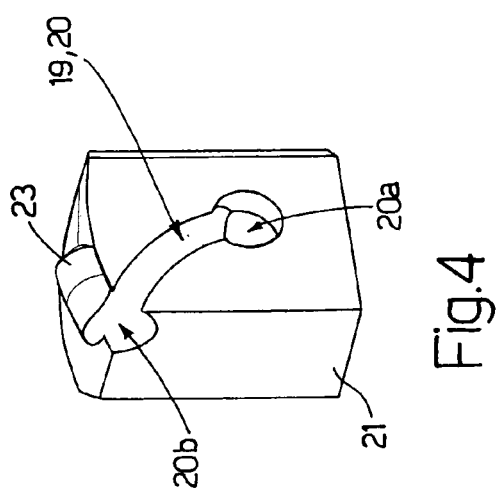
Fig.3
Fig.4

STEERING UNIT FOR AN ELECTRIC VEHICLE

The present invention concerns a steering unit for an electric vehicle.

In particular, the present invention concerns a steering unit of the type including an electric motor having a tubular output shaft assembled so as to rotate around its own particular longitudinal axis; and a steering rod extending through the output shaft and connected to the same output shaft by means of a recirculating ball screw-nut screw coupling in order to move along the cited axis and to control the steering of a pair of wheels of the vehicle.

BACKGROUND OF THE INVENTION

The known steering units of the type described above show certain drawbacks mainly arising from the fact that the realization of the recirculating ball systems used in such steering units involves relatively complex and expensive machining.

SUMMARY OF THE INVENTION

The purpose of the present invention is to provide a steering unit for an electric vehicle that is without the drawbacks explained above and that is both simple and economic to produce.

A steering unit for an electric vehicle is provided according to the present invention according to claim 1.

BRIEF DESCRIPTION OF THE DRAWINGS

The present invention will now be described with reference to the enclosed drawings, that illustrate a non-limiting embodiment example of such, in which:

FIG. 3 is a second longitudinal section of the steering unit of FIG. 1; and

FIG. 4 is a perspective view of a part of FIG. 2.

DETAILED DESCRIPTION OF THE INVENTION

Figure 1:
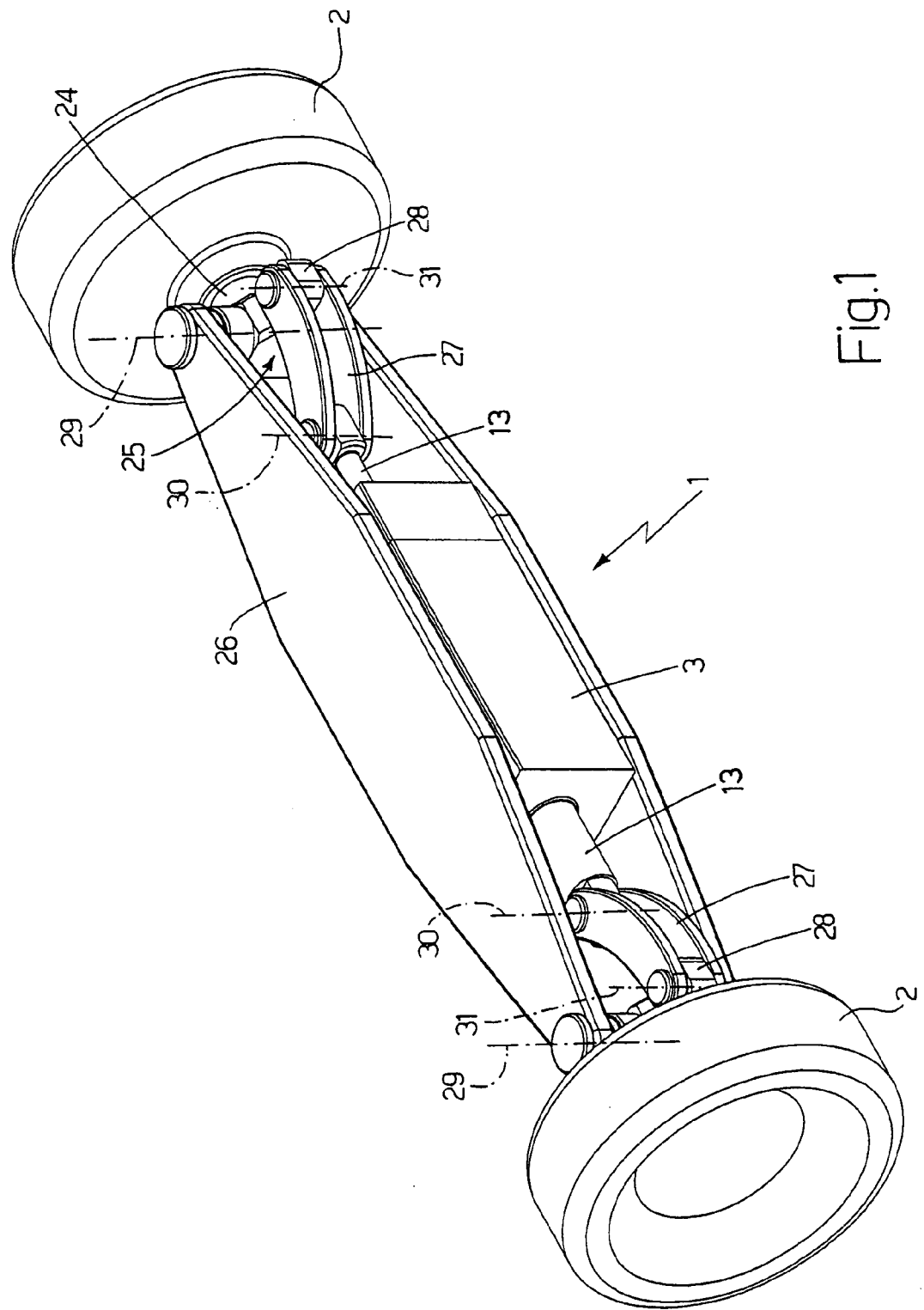
FIG. 1 is a schematic perspective view of a preferred embodiment of the steering unit of the present invention.

With reference to FIG. 1, denoted by 1, as a whole, is a steering unit able to control the steering of a pair of wheels 2 of an electric vehicle of known type and not shown such as, for example, a lift truck or an electric vehicle for the transportation and the handling of objects and/or people in an airport environment.

Figure 2:
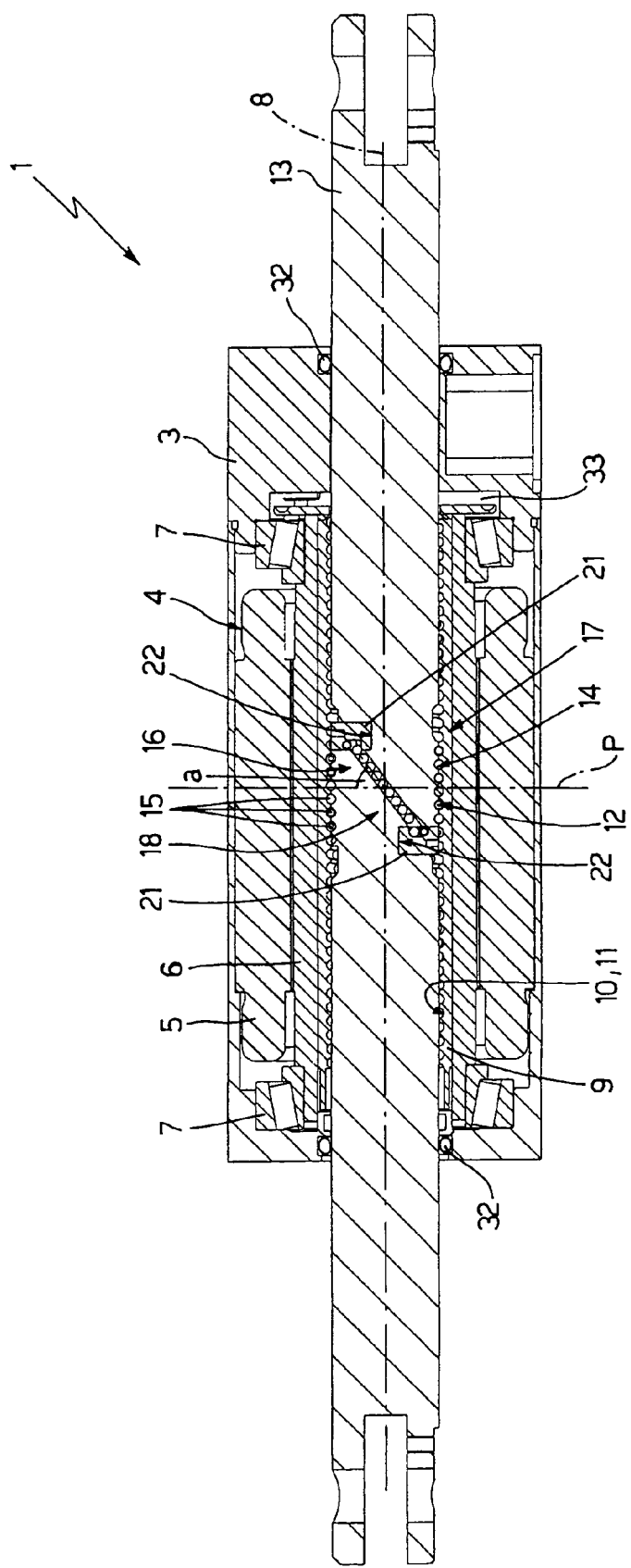
FIG. 2 is a first longitudinal section of the steering unit of FIG. 1.

According to that illustrated in FIG. 2, the unit 1 includes an external tubular frame 3 housing an electric motor 4, which includes, in turn, a stator 5 and a rotor 6 assembled inside the stator 5 to rotate, as regards the same stator 5 and through the interposition of a pair of rolling bearings 7, around its own longitudinal axis 8.

The rotor 6 is connected in an angularly fixed manner to a tubular output shaft 9, which is entirely assembled inside the frame 3 coaxially to the axis 8, it has an internal thread 10 made on a surface 11 inside the same shaft 9, and is connected by means of a screw-nut screw coupling 12 to a steering rod 13, that is assembled by means of the shaft 9 so as to protrude outside the frame 3, it has a diameter basically equal to the internal diameter of the shaft 9, and is equipped with an external thread 14 provided at its middle section.

The coupling 12 is a recirculating ball coupling and includes a train of balls 15 engaged in a closed ring recirculating track 16 and including, in turn, a first section 17 defined between the threads 10 and 14, a second section defined by a basically rectilinear hole 18, which extends between the ends of the section 17, and is made through the rod 13 so as to form an angle a different from 90° with a reference plane P at a right angle to the axis 8, and two third connecting sections 19 of the hole 18 with the section 17. Each section 19 is defined by a respective guide channel 20 made in a deflector element 21 housed inside a relative seat 22, which is provided in the rod 13 so as to open outwards at an external surface of the same rod 13, and it is circumferentially offset as regards the other seat 22 by an angle of basically 180°.

According to that illustrated in FIG. 4, the channel 20 opens outwards at a lateral surface of the element 21, and includes a first portion 20a, which is basically parallel to the axis 8, and connects with the hole 18, and a second portion 20b, that is positioned transversely to the axis 8, connects with the section 17, and is equipped with a protrusion 23 engaged in the thread 10 and able to move the balls 15 between the section 17 and the hole 18.

With reference to FIG. 1, each wheel 2 is assembled on a relative wheel hub made on a first arm 24 of an equalizer 25, which is hinged to a frame 26 of the vehicle (not shown) to oscillate, as regards the frame 26 and under the force of a connecting rod 27 interposed between the rod 13 and a second arm 28 of the equalizer 25, around a fulcrum axis 29 basically vertical and transversal to the axis 8. The connecting rod 27 extends between two axes 30, 31 parallel to the axis 29, and of which the axis 30 is the rotation axis of the connecting rod 27 as regards the rod 13 and the axis 31 is the rotation axis of the connecting rod 27 as regards the arm 28.

The frame 3 is limited axially by two ring-shaped gaskets 32, which are assembled coaxially to the axis 8, they are interposed between the frame 3 and the rod 13, and delimit a chamber 33 entirely containing the screw-nut screw coupling 12, i.e. the shaft 9 and the thread 14. The presence of the gaskets 32 allows, therefore, the lubrication of the coupling 12 exclusively during the assembly of the unit 1.

According to that illustrated in FIG. 3, the unit 1 is further equipped with a latching device 34 able to angularly lock the shaft 9 around the axis 8 and to prevent, therefore, the axial displacement of the rod 13 in the absence of power supply to the motor 4 allowing the vehicle (not shown) to maintain the direction of advancement held before the interruption of the electricity supply.

The device 34 includes a ring-shaped plate 35, which is fixed to the rotor 6 at a right angle to the axis 8, it extends around the rod 13, and has a plurality of seats 36 made parallel to the axis 8 and uniformly distributed around the same axis 8.

The device 34 further includes a pin 37, which has a longitudinal axis 38 parallel to the axis 8, and is sliding assembled inside a tubular electromagnet 39, that is fixed to the frame 3 coaxially to the axis 38, and is electrically connected to the motor 4 to keep, normally, the pin 37 in a position of release, in which the same pin 37 is positioned outside the seats 36.

In the absence of power supply to the motor 4 and, therefore, to the electromagnet 39, the pin 37 is moved, under the force of a spring 40 interposed between the frame 3 and the pin 37, into a position of engagement, in which the same pin 37 engages one of the seats 36.

The motor 4 is equipped with a plurality of sensors (not shown), in the case in point Hall effect sensors, which are used both for the switching of the phases to be powered, as well as to control the axial position of the rod 13 avoiding the use of a resolver and/or encoder. For the control of the axial position of the rod 13, the motor 4 is further equipped with an electronic control box (not shown) able to calculate the axial position of the rod 13 depending on the number of times that the permanent magnets of the rotor 6 pass in front of the cited sensors (not shown) and depending on the pitch of the threads 10 and 14.

The operation of the steering unit 1 is easily deducible from that explained above and does not require further explanation.

The steering unit 1 has certain advantages mainly arising from the fact that the realization of the recirculating track 16 is made relatively simple and economic by the presence of a hole, i.e. the hole 18, made through the rod 13 and that the deflector elements 21 are relatively strong and reliable.

What is claimed is:

1. Steering unit for an electric vehicle, the steering unit comprising an electric motor (4) having a tubular output shaft (9) assembled so as to rotate around its own particular longitudinal axis (8); and a steering rod (13) assembled through said output shaft (9) and connected to the same output shaft (9) by means of a recirculating ball screw-nut screw coupling (12) in order to move along said axis (8) and control the steering of a pair of wheels (2) of the vehicle; the screw-nut screw coupling (12) comprising at least one closed ring recirculating track (16) and a train of balls (15) engaged in said recirculating track (16), the recirculating track (16) comprising, in turn, a first section (17) defined between the output shaft (9) and the steering rod (13), a second section (18) extending between the ends of the first section (17), and two third sections (19) connecting the first and the second section (17, 18) with one another; wherein the second section (18) extends through the steering rod (13) and is disposed at an angle (a) other than 90° with respect to a reference plane (P) basically at a right angle to said axis (8); and wherein the steering unit further comprises a latching device (34) to angularly lock the output shaft (9) around said axis (8) in the absence of power supply of the electric motor (4).

2. Steering unit as claimed in claim 1 and further comprising two deflector elements (21) equipped with respective guide channels (20) each defining a respective said third section (19).

3. Steering unit as claimed in claim 2, in which the steering rod (13) is equipped with two seats (22) opening outwards at an external surface of said steering rod (13) and each able to house a respective one of said deflector element (21).

4. Steering unit as claimed in claim 3, in which said seats (22) are circumferentially offset with respect to each other.

5. Steering unit as claimed in claim 1 and further comprising a tubular frame (3) able to house said electric motor (4) and two ring-shaped gaskets (32) able to axially limit the frame (3) to define, together with said frame (3), a chamber (33) containing the whole screw-nut screw coupling (12).

6. Steering unit as claimed in claim 1, in which the latching device (34) includes a plurality of seats (36) distributed around said axis (8) and angularly integral with said output shaft (9), at least one pin element (37) movable between a position of engagement, in which said pin element (37) engages a said seat (36), and a position of release, elastic pushing means (40) acting on the pin element (37) to keep the pin element (37) in said position of engagement, and actuator means (39) to move the pin element (37) into said position of release against the action of said elastic pushing means (40).

7. Steering unit as claimed in claim 6, in which said actuator means (39) comprises an electromagnet (39) electrically connected to said electric motor (4).

* * * * *